United States Patent
Hamano

(10) Patent No.: US 7,780,810 B2
(45) Date of Patent: Aug. 24, 2010

(54) ADHESION DEVICE FOR APPLYING AND RELEASING BIOMIMETIC MICROSTRUCTURE ADHESIVE FROM A CONTACT SURFACE

(75) Inventor: Miles M. Hamano, Honolulu, HI (US)

(73) Assignee: RD & L Unique Products, LLC, Honolulu, HI (US)

( * ) Notice: Subject to any disclaimer, the term of this patent is extended or adjusted under 35 U.S.C. 154(b) by 515 days.

(21) Appl. No.: 11/849,341

(22) Filed: Sep. 3, 2007

(65) Prior Publication Data

US 2009/0020222 A1 Jan. 22, 2009

Related U.S. Application Data

(60) Provisional application No. 60/959,962, filed on Jul. 16, 2007, provisional application No. 60/959,963, filed on Jul. 16, 2007.

(51) Int. Cl.
*B29C 65/76* (2006.01)
*B32B 37/14* (2006.01)
*B32B 37/26* (2006.01)
*B32B 38/18* (2006.01)

(52) U.S. Cl. ............... 156/247; 156/249; 156/297; 156/344

(58) Field of Classification Search .......... 156/61, 156/155, 166, 249, 250, 264, 297, 299, 344; 428/373, 374, 397; 134/26; 977/720, 724, 977/734, 753, 902, 961, 962
See application file for complete search history.

(56) References Cited

U.S. PATENT DOCUMENTS

2005/0148984 A1* 7/2005 Lindsay et al. ............. 604/387

* cited by examiner

*Primary Examiner*—Philip C Tucker
*Assistant Examiner*—Sing P Chan
(74) *Attorney, Agent, or Firm*—Leighton K. Chong

(57) ABSTRACT

An adhesion device is made up of three parts: an anchor portion; a peeler layer; and a "biomimetic microstructure adhesive" (BMA) portion. The anchor portion has one side affixed to a part of an object to be releasably adhered to a surface. The peeler layer has an inwardly facing side thereof affixed to the other side of the anchor portion. The BMA portion is affixed to an outward side of the peeler layer with its setae facing outwardly towards the surface to be adhered to. The anchor portion is affixed to the peeler layer at a position offset from the position at which the BMA portion is affixed, so that the object may be releasably detached from adhesion with the surface.

7 Claims, 5 Drawing Sheets

BMA PEELING MECHANICS

BMA PEELING MECHANICS

TOP VIEW

FOLDED PEELER

Q-SHAPED PEELER

FLATTENED THIN-WALL TUBE PEELER

PEELER MADE FROM STIFF SECTIONALIZED PIECES WITH HINGED JOINTS

ADHESION DEVICE FOR APPLYING AND RELEASING BIOMIMETIC MICROSTRUCTURE ADHESIVE FROM A CONTACT SURFACE

This U.S. patent application claims the priority of U.S. Provisional Patent Applications 60/959,962 and 60/959,963 filed on Jul. 16, 2007, by the same inventor.

TECHNICAL FIELD

This invention relates to applications for biomimetic microstructure adhesives (BMA), and particularly, to a device for applying and releasing a BMA adhesive from a contact surface.

BACKGROUND OF THE INVENTION

There is an ongoing need for improved adhesives in applications for everyday life, such as for taping, fastening, or attaching objects together, as well as in high technology applications, such as for clean and secure handling of semiconductor wafers, attachment of fiber optic devices, assembly of micro-fabricated components, etc. A particular need in many such applications is for an adhesive that can readily attach to a contact surface and hold on to it with high force during use, yet can be readily detached from the contact surface and without leaving any residue or damaging the surface.

Recent scientific research has noted that geckos are exceptional in their ability to rapidly climb up smooth vertical surfaces, including even glass or smooth metal surfaces. The mechanism of toe adhesion to climbing surfaces used by geckos is attributed to the morphology of its unique toe hairs, called "seta", as described in U.S. Pat. No. 7,011,723 issued Mar. 14, 2006, to R. Full et al. By mimicking the natural seta, artificial seta microstructures have been fabricated having the adhesion property of gecko setae for use as an adhesive, such as disclosed U.S. Pat. No. 6,872,439, issued Mar. 29, 2005, to R. Fearing et al. These fabricated microstructure adhesives are generally referred to as "biomimetic microstructure adhesives" (BMA). Various methods have also been developed to manipulate BMA adhesive structures for improved holding of a substrate to a support surface, such as described in U.S. Pat. No. 6,722,026, issued Apr. 20, 2004, to M. Lent, and in U.S. Published Application 2005/0148984 of Lindsay et al, published Jul. 7, 2005.

However, the prior methods of using BMA adhesive for holding an object to a surface have not addressed the problem of how to easily release the BMA adhesive from the surface through simple and convenient means. In particular, it would be desirable to use BMA adhesive to hold clothing, jewelry, eyeglasses, or other accessories in contact with human skin, yet be able to easily release the BMA adhesive pad from the skin without causing any discomfort or pain to the user.

SUMMARY OF INVENTION

In accordance with the present invention, an adhesion device is configured as a BMA "applicator" made up of three parts: an anchor portion; a peeler layer; and a "biomimetic microstructure adhesive" (BMA) portion. The anchor portion has one side affixed to a part of an object to be releasably adhered to a surface. The peeler layer has an inwardly facing side thereof affixed to the other side of the anchor portion. The BMA portion is affixed to an outward side of the peeler layer with its setae facing outwardly towards the surface to be adhered to. The anchor portion is affixed to the peeler layer at a position offset from the position at which the BMA portion is affixed, so away at an angle to the surface and pulling on only an initial set of setae of the BMA portion proximate to the offset position of the anchor portion.

The BMA applicator of the invention can be applied to industrial uses, as well as to everyday uses. For industrial applications, the BMA applicator is characterized by the capability to hold objects with high holding forces, yet release them easily with low forces. For everyday uses, the object can be held by contact with the skin, clothing, or with other part of the user, while easily releasing without causing any discomfort or pain to the user.

As an example of everyday use, the BMA applicator can be applied to nosepads of eyewear to hold the eyewear onto the nose of a wearer. The nosepad is the part of the object that is affixed by an anchor pad to one side of a peeling layer mounting a BMA pad that is to be placed in contact with the wearer's nose. The offset positioning aids in engaging higher adhesion forces when the BMA pads are placed in contact with the wearer's nose, as well enabling the BMA pads to be readily detached by pulling on a small set of setae at a time and at a force-reducing detachment angle. This allows the eyewear to be removed from the wearer's nose with a "featherweight" feel as compared to the holding forces for the object itself, thereby avoiding any discomfort or pain to the user.

In other preferred embodiments, the BMA applicator may be formed with a "folded peeler", a "Q-shaped peeler", a flattened, thin-wall tube peeler, and with a peeler made from stiff sectionalized pieces with hinged joints.

Other objects, features, and advantages of the present invention will be explained in the following detailed description of the invention having reference to the appended drawings.

DETAILED DESCRIPTION OF THE INVENTION

Figure 1:
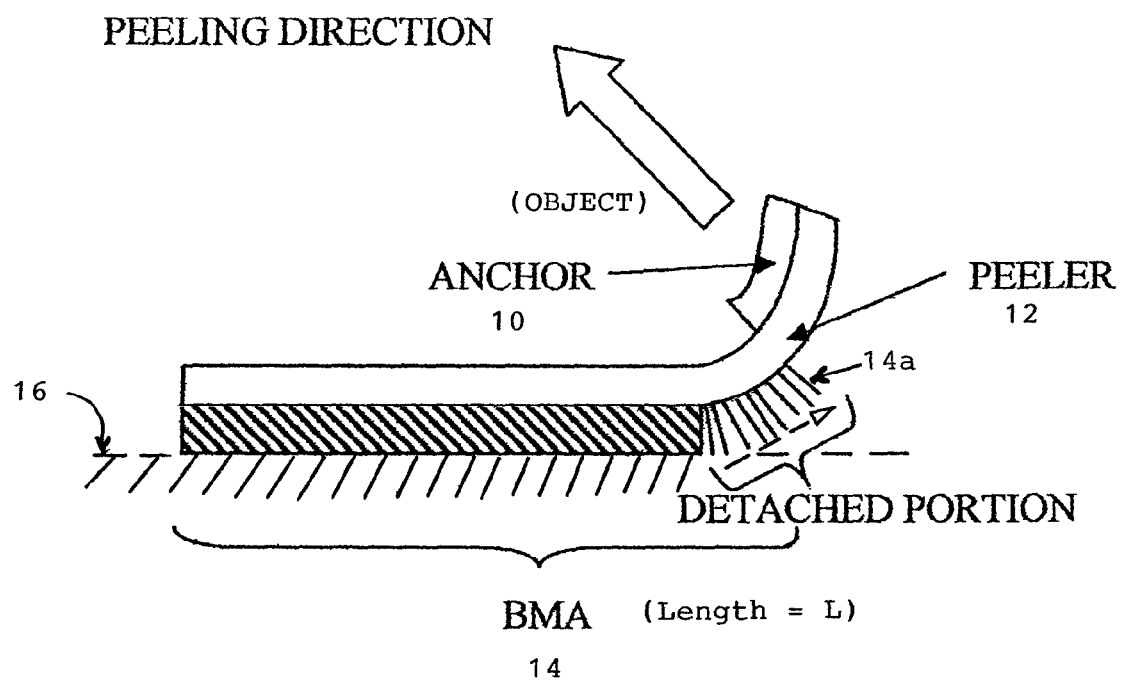
FIG. 1 shows an adhesion device in accordance with the present invention is configured as a BMA "applicator" made up of three parts

The present invention utilizes the unique surface adhesion property of the toes of geckos to configure an adhesive device for mounting to an object that is to be adhered to and easily released from a contact surface. The adhesion property of the gecko's toes is attributed to the morphology of its unique toe hairs, called "seta". Each seta has a shaft and an array of paddle-shaped spatulae at the end of the shaft. Adhesion is produced as the spatulae come into intimate contact with a surface. In general, the seta shaft is about 10 to 100 microns long, and the diameter of the shaft is about 0.05 times the length of the shaft of a sphere, as shown below. Besides the commonly known Tokay species of gecko, many other species of gecko (e.g., clade Gekkonoidea, species of Anolis) and several skink species also have adhesive setae.

The adhesion property of a seta is found to be produced by its three-dimensional orientation pointing toward or away from the surface, and the extent to which the seta is preloaded, i.e., pushed into and pulled along in contact with the surface, during initial contact. The force resulting from pulling the seta parallel to the surface during attachment increased when setae were first pushed toward the surface, providing a perpendicular preloading force. As described in U.S. Pat. No. 7,011,723 issued Mar. 14, 2006, to R. Full et al., seta that are first pushed (preloaded) onto the surface and then pulled parallel to it developed over ten times the force required to pull away from the surface as compared to contact only through perpendicular preloading. The results of preloading with a small perpendicular force in concert with a sideward displacement (parallel preload) show that this combination engages the highest levels of adhesion, probably similar to the common pushing and swiping a suction cup into contact with a smooth surface to "seat" the suction cup. Preloading is also believed to increase the number of spatulae contacting the surface.

The orientation of the setae is also important in detachment. It has been reported that the setae are more readily detached when pulled away at an angle from the surface. Detachment at an angle corresponds to observed movements of the gecko's toes during locomotion. Geckos have been observed to peel the tips of their toes away from a smooth surface during running. Toe peeling may put an individual seta in an orientation or at a critical angle that aids in its release. Secondly, toe peeling concentrates the detachment force on only a small subset of all attached setae at any instant.

By mimicking the natural seta, artificial seta microstructures have been fabricated having the adhesion property of gecko setae for use as an adhesive, such as disclosed in U.S. Pat. No. 7,011,723, and also in earlier patents such as U.S. Pat. No. 6,872,439, issued Mar. 29, 2005, to R. Fearing et al. These fabricated microstructure adhesives are generally referred to as "biomimetic microstructure adhesives" (BMA). Artificial spatulae may be formed by extruding liquid polymer, forming a flattened cup or mushroom shape, then curing. Alternatively, a nano-channel glass, which consists of a large bundle of hollow glass fibers, can be filled with a polymer, and then the glass can be dissolved in an acid. Stalks and spatulae may also be formed from a mold using a nano-imprinting roller. Artificial BMA arrays can be fabricated with millions of synthetic setae rooted to a support layer, which can be manipulated, shaped and/or sized for any suitable use.

There are two types of BMAs. The first type is anisotropic (directional adhesion/friction), e.g., earlier versions of BMAs were of this type. The second type is isotropic (non-directional adhesion/friction), e.g., BMAs using microfibers, nanotubes, etc., are of this type. In the following description, the preferred embodiments are described using isotropic type BMA for more flexible and convenient. While anisotropic BMA may also be used in the described applications, special consideration must be given to anisotropic BMA directionality to properly design and configure devices to be used in any given application.

Referring to FIG. 1, an adhesion device in accordance with the present invention is configured as a BMA "applicator" made up of three parts: an anchor portion 10; a peeler layer 12; and a BMA portion 14. The anchor portion 10 is made of a durable material and has one side fixed or fastened to a part of an object to be releasably adhered to a surface 16. The peeler layer 12 is made of a bendable, preferably elastically flexible, material in an elongated or planar shape (when unloaded). The peeler layer 12 has an inward side thereof affixed to the other side of the anchor portion 10. The BMA portion 14 is mounted with its support layer affixed to an outward side of the peeler layer 12 and with its setae facing outwardly towards the surface 16 to be adhered to. The anchor portion is affixed to the peeler layer at a planar position offset from the planar position at which the BMA portion is affixed. The object is adhered to the surface 16 by moving the part with the anchor pad affixed thereto into contact with the surface 16. The setae 14a of the BMA portion 14 are preloaded perpendicularly into contact with the surface by the movement of the object part towards the surface. As the object part is moved further perpendicularly into contact with the surface, the setae 14a of the BMA portion are subjected to a small sideways displacement force, due to the offset positioning of the anchor portion 10 to one side of the BMA portion 14. The contacting of the setae perpendicularly with the surface and then pulling sideways develops a greater adhesion force, as noted previously, than contact only through perpendicular preloading.

The offset positioning of the anchor portion 10 to one side of the BMA portion 14 plays a crucial role in releasably detaching the object from adhesion with the surface. If the object is pulled straight away from the surface, the high adhesion forces maintained by the setae would make removal difficult. This is particularly important when the object is an item of clothing, jewelry, eyeglasses, or other accessory placed in contact with human skin, as pulling on the object while the high adhesion forces of the BMA portion are maintained can cause discomfort or pain to the user. Instead, the flexible characteristic of the peeler layer 12 and the offset positioning of the anchor portion 10 to one side of the BMA portion 14 results in the side of the peeler layer 12 attached to the anchor portion pulling upward first as the object is removed from the surface. As the object continues to be pulled away, the upwardly moving side of the peeler layer 12 exerts a pulling force first on the small number of leading setae 14a (the leading ones at the right-hand side of the BMA in FIG. 1), while the other setae of the BMA portion 14 remains in contact with the surface 16.

Besides needing to pull on only a small number of the total setae with the initial detachment movement, the force required for detachment of each setae is greatly reduced due to the pulling angle of the upwardly moving side of the peeler layer 12 being at an inclined angle to the surface (direction of the dashed arrow in the figure). As noted in prior research, the spatulae of the setae are more readily detached when pulled away at an angle from the surface. Initial peeling of the object from the offset position applies the pulling force on the initial setae at an inclined angle. This allows the first numbers of setae to be detached with only a slight force compared to their adhesion force if pulled directly upward. Where the object is an item of clothing or accessory placed in adhesion to the wearer's skin, the light force of initial detachment has a "featherweight" feel as compared to the high holding forces of adhesion for the object itself, and thereby avoids any discomfort or pain to the user. As the pulling of the object away from the surface continues, each successive group of setae pulled at the pulling angle can likewise detach from the surface with only a slight pulling force. This continues in an "unzipping" fashion until the entire length L of the BMA portion 14 is detached. In BMA applications involving skin, the BMA setae and support layer must be hypoallergenic.

Figure 2A:
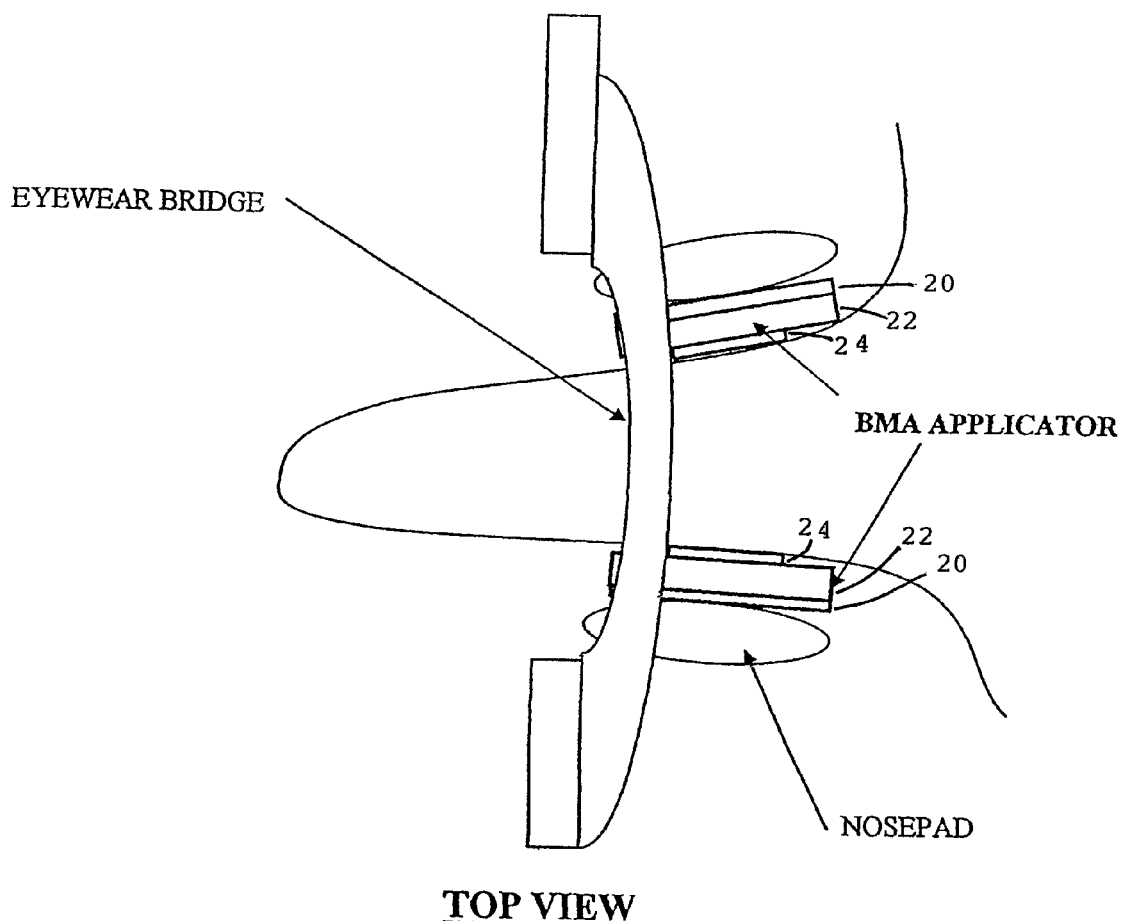
FIG. 2A and FIG. 2B show top and front views, respectively, of a BMA applicator device applied to the nosepads of eyewear.
Figure 2B:
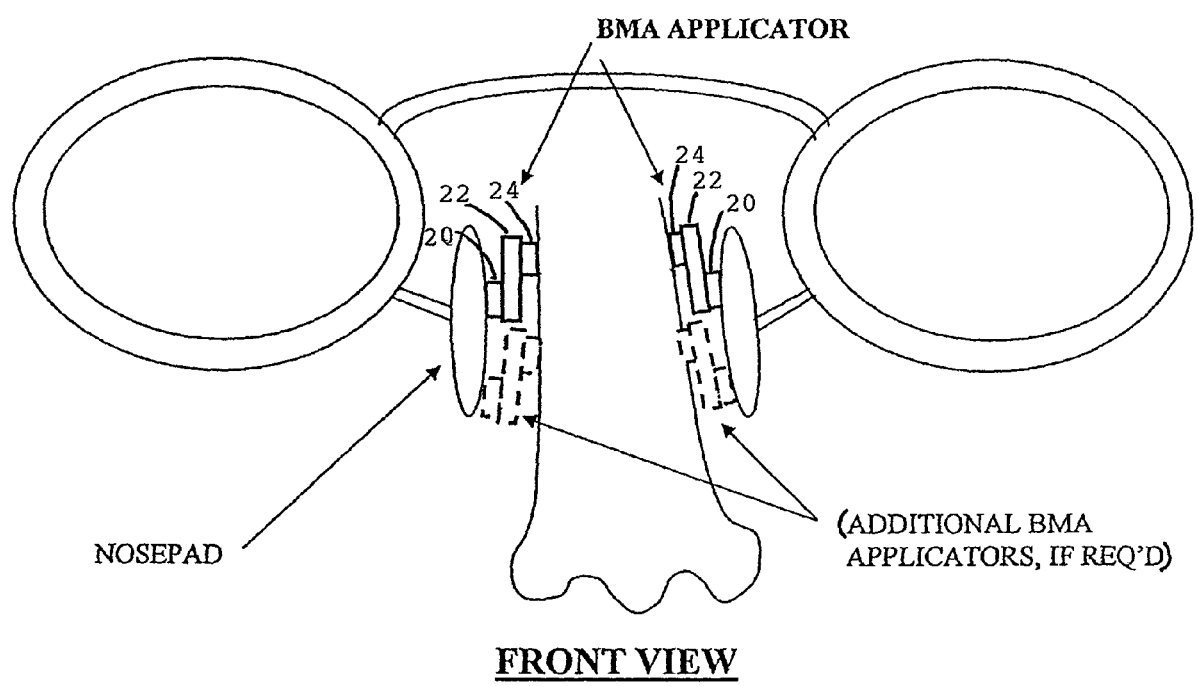

As shown in the top view of FIG. 2A and the front view of FIG. 2B, a BMA applicator is applied to nosepads of eyewear to hold the eyewear onto the nose of a wearer. The nosepad is the part of the object that is affixed to one side of an anchor pad 20 of the BMA applicator device. A peeling layer 22 has an inward side attached to the other side of the anchor pad 20, and an outward side mounting a BMA pad 24, which is to be placed in contact with the wearer's nose. As visible more clearly in FIG. 2B, the anchor pad 24 is positioned at an offset position from the BMA pad 24 along the length of the peeler layer 22. As described previously, this offset positioning aids in engaging higher adhesion forces when the BMA pads 24 are placed perpendicularly in contact with the wearer's nose and pulled slightly sidewards due to the offset of the anchor pads from the BMA pads. The offset positioning also enables the BMA pad to be detached by small numbers of setae at a time and at a force-reducing detachment angle, so that the detachment forces required to remove the object from the wearer's nose with a "featherweight" feel as compared to the holding forces for the object itself, thereby avoiding any discomfort or pain to the user. The BMA pad positioning relative to the anchoring to the nosepads is arranged so that the wearer can use a normal hand-arm motion to place the eyewear on the nose (with slight pressure at the end to further engage the setae of the BMA), and, due to the offset positioning, can also use a normal hand-arm motion to remove the eyewear from the nose.

Each nosepad can have additional BMA applicators if required. For more vigorous use, such as sports eyewear, more BMA applicators can be added elsewhere on the eyewear. A good second location is on the inside surfaces of the arms that extend around the ears. The BMA pad should be positioned between the anchor pad and the wearer's face at each position on the rigid frame of the eyewear.

An additional BMA applicator(s) may be added, preferably, to the outside surface of one of the arms close to the hinge to hold the arms closed when the eyewear is not being used. Additional BMA applicator(s) may be located elsewhere on the eyewear, for example, to allow attachment to the wearer's clothing, skin, or other location for convenience of the wearer.

The anchor pad is preferably formed as an adhesive layer, preferably made of a sticky material. The anchor portion can be another BMA with stronger adhesion, or can be sewing, clamping, clipping, riveting, stapling, covering, harnessing, screwing, bolting, tying, welding, soldering, or heat-shrinking. The peeler layer is preferably in a thin, rectangular shape and preferably made from a flexible, resilient material such as rubber or plastic. The BMA pad and the peeler layer can be separate parts that are attached together using an adhesive, or can be integrally formed together, or the peeler can be fitted into a slotted opening in the BMA pad, or vice versa, or connected through an intervening layer. The peeler layer may be formed integrally with an anchor part of the object to eliminate the need for a separate anchor pad. Also, the peeler can be stiffened using a shaped form, such as the concave form used to stiffen a metal tape or tape ruler or "humps" on flexible plastic sheets. Variances in dimensions, material, or thickness may be made, such as a greater depth for stiffness, or shallower depth for flexibility. The peeler can be made of metal, rubber, plastic, composite material, wood, paper or cloth. It may also come in a wide range of other shapes and forms, and may be attached to the anchor or BMA by any other suitable method.

Figure 3:
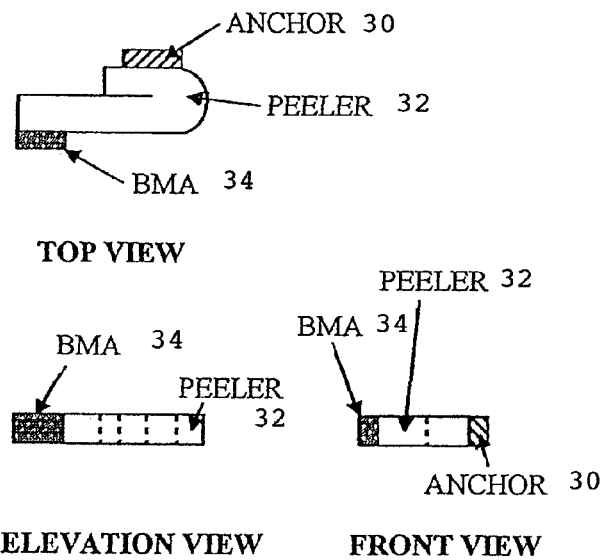
FIG. 3 shows a BMA applicator with a "folded peeler".

Other configurations may be devised for the BMA applicator. FIG. 3 shows a BMA applicator with a "folded peeler" 32 made of flexible material in which one end of the peeler is folded over, and an anchor portion 30 is attached to an inwardly facing side thereof, and a BMA portion 34 is attached to an outwardly facing side at an opposite end of the peeler 32. Due to the folded over length of the peeler, a pulling force on the anchor portion will unfold the folded-over part of the peeler layer, resulting in the anchor portion's position being offset from the position of the BMA (the anchor portion does not need to be in an offset position when the peeler layer is folded). This folded peeler configuration thus enables pulling of the anchor portion 30 on the leading setae at an inclined angle when unfolded to reduce the detachment force required.

Figure 4:
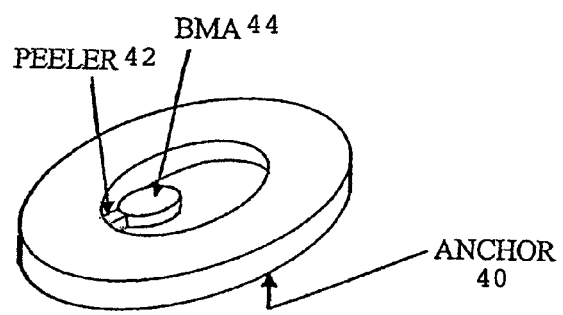
FIG. 4 shows a BMA applicator with a "Q-shaped peeler".

FIG. 4 shows a BMA applicator with a "Q-shaped peeler" in which the peeler 42 is a flexible neck extending from an annular-shaped anchor portion 40 to a BMA portion 44 positioned offset therefrom in a center hole of the annular shape.

Figure 5:
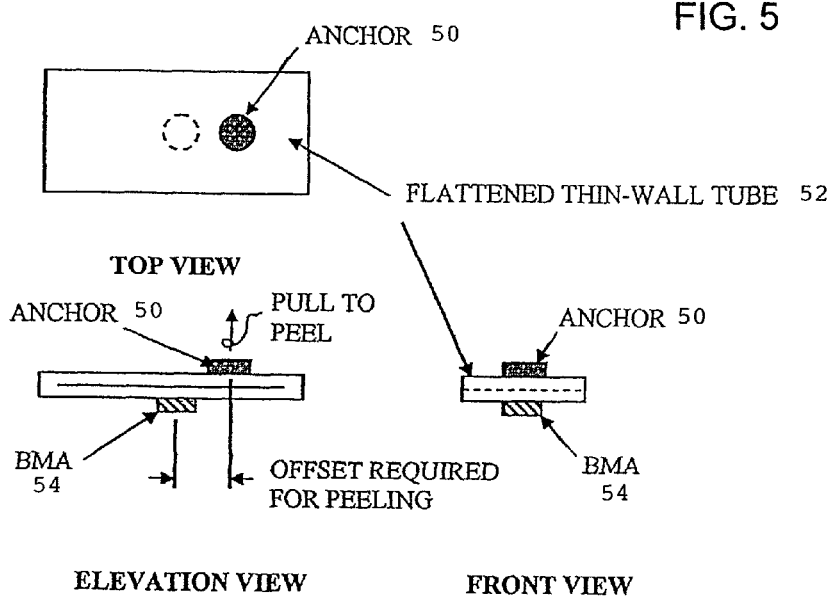
FIG. 5 shows a BMA applicator with a flattened, thin-wall tube peeler.

FIG. 5 shows a BMA applicator with a flattened, thin-wall tube peeler in which the peeler 52 is in a thin-wall tubular shape that is folded flat, and an anchor portion 50 is attached to an inwardly facing side thereof and a BMA portion 54 is positioned in an offset position for peeling. When the object is to be removed, the upward movement of the anchor pulling on the flattened tubular shape as well as its offset position enables the BMA portion to be detached at a high detachment angle and with reduced detachment forces.

Figure 6:
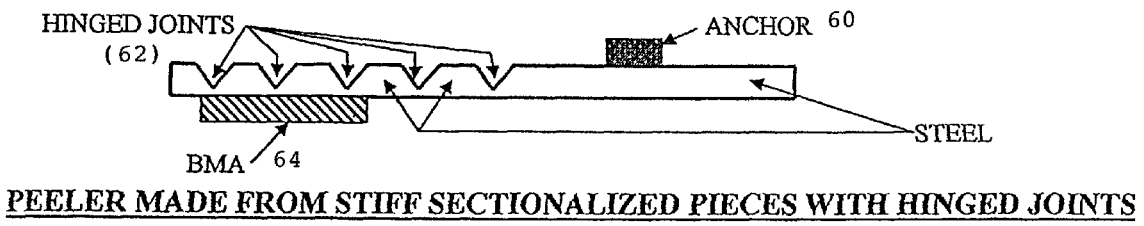
FIG. 6 shows a BMA applicator with a peeler made from stiff sectionalized pieces with hinged joints.

FIG. 6 shows a BMA applicator with a peeler 62 made from stiff sectionalized pieces with hinged joints. The peeler 62 can be made of a rigid, high strength material such as steel (for high stress environments), while the hinged joints provide the flexibility for the anchor 60 to pull up on the proximate side of the BMA portion 64 for progressive detachment.

The BMA applicator device of the invention may be utilized in a variety of ways, for industrial use as well as everyday use. For example, it may be used in micromachine, micromanufacturing, micromanipulation, and microsurgery applications. In such applications, the BMA applicator is characterized by the capability to hold objects with high holding forces, yet release them easily with low forces. Examples of everyday uses include ornaments, fashion wear and other wearable items, toys, fasteners, cleaners, and the like. In such uses, the object can be held by contact with the skin, clothing, or with other part of the user, while easily releasing without causing any discomfort or pain to the user.

It is understood that many modifications and variations may be devised given the above description of the principles of the invention. It is intended that all such modifications and variations be considered as within the spirit and scope of this invention, as defined in the following claims.

The invention claimed is:

1. A method of employing an adhesion device for releasably holding an object to a surface comprising:
   providing an anchor portion having one side thereof to be affixed to a part of an object to be releasably adhered to the surface;
   providing a peeler layer made of a flexible material and having an inwardly facing side thereof affixed to an opposite side of the anchor portion; and
   providing a "biomimetic microstructure adhesive" (BMA) portion affixed to an outwardly facing side of said peeler layer with its setae facing outwardly towards the surface to be adhered to, and
   positioning said anchor portion at a position that is laterally offset from a position at which the BMA portion is affixed, so that when said anchor portion is lifted to remove the object from the surface, said anchor portion pulls on the laterally offset position of the flexible peeler layer to thereby start pulling first on an initial set of setae of said BMA portion proximate to the offset position of the anchor portion causing said initial set of setae to be pulled at a force-reducing inclined detachment angle from the surface and passing the pulling force on said anchor portion at the laterally offset position on to successive setae in turn to thereby reduce the overall pulling force required to remove the BMA portion from the surface and thereby make release of the object easier.

2. A method of employing an adhesion device according to claim 1, wherein the adhesion device is applied to industrial uses, in which the BMA portion is provided for holding an object in an industrial process, and characterized by the capability to hold objects securely yet release them easily.

3. A method of employing an adhesion device according to claim 1, wherein the adhesion device is applied to everyday uses, in which the BMA portion is provided for holding an object in contact with the skin, clothing, or with other part of the user, and characterized by being easily releasable without causing any discomfort or pain to the user.

4. A method of employing an adhesion device according to claim 1, wherein said peeler layer is made of flexible material and a length of one end of the peeler layer is folded over, and said anchor portion is attached to an inwardly facing side of the one folded end, and a BMA portion is attached to an outwardly facing side of the peeler layer, wherein a pulling force on the anchor portion will unfold the folded-over length of the peeler layer and result in the anchor portion's position being offset from the position of the BMA portion, thereby enabling pulling on the anchor portion to pull on the initial group of setae at an inclined angle from the surface.

5. A method of employing an adhesion device according to claim 1, wherein wherein said peeler layer is formed as a flexible neck portion extending from an annular-shaped anchor portion to a BMA portion offset therefrom and positioned in a center hole of the annular shape.

6. A method of employing an adhesion device according to claim 1, wherein said peeler layer is in a thin-wall tubular shape that is folded flat, and an anchor portion is attached to an inwardly facing side thereof and a BMA portion is positioned in an offset position therefrom for enabling upward movement of the anchor portion to open the flattened tubular shape as well as pull from its offset position to enable the BMA portion to be detached at a high detachment angle and with reduced detachment forces.

7. A method of employing an adhesion device according to claim 1, wherein said peeler layer is made from stiff sectionalized pieces with hinged joints to provide flexibility for the anchor portion to pull up on the proximate side of the BMA portion for progressive detachment.

* * * * *